US012068083B2

United States Patent
Yoon et al.

(10) Patent No.: US 12,068,083 B2
(45) Date of Patent: Aug. 20, 2024

(54) METHOD FOR MANUFACTURING MULTI-LAYERED NUCLEAR FUEL CLADDING PIPE

(71) Applicants: GACHON UNIVERSITY OF INDUSTRY—ACADEMIC COOPERATION FOUNDATION, Seongnam-Si (KR); KOREA ADVANCED INSTITUTE OF SCIENCE AND TECHNOLOGY, Daejeon (KR)

(72) Inventors: Young Soo Yoon, Gwacheon-si (KR); Yong Hee Kim, Daejeon (KR); Dae Yun Kim, Seongnam-si (KR); You Na Lee, Yongin-si (KR)

(73) Assignees: GACHON UNIVERSITY OF INDUSTRY—ACADEMIC COOPERATION FOUNDATION (KR); KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 282 days.

(21) Appl. No.: 17/691,112

(22) Filed: Mar. 9, 2022

(65) Prior Publication Data
US 2022/0241889 A1      Aug. 4, 2022

Related U.S. Application Data

(63) Continuation of application No. PCT/KR2021/000509, filed on Jan. 14, 2021.

(30) Foreign Application Priority Data

Jan. 23, 2020 (KR) .................. 10-2020-0009509

(51) Int. Cl.
B21B 17/04 (2006.01)
G21C 3/12 (2006.01)
B23K 101/10 (2006.01)

(52) U.S. Cl.
CPC ................ G21C 3/12 (2013.01); B21B 17/04 (2013.01); B23K 2101/10 (2018.08)

(58) Field of Classification Search
CPC ......... B21B 17/00; B21B 17/02; B21B 17/04; B21B 17/06; B21B 25/00; B21C 37/154; B21C 37/30; B21C 37/06; B21D 41/04
See application file for complete search history.

(56) References Cited

U.S. PATENT DOCUMENTS 4,289,011 A * 9/1981 Yoshiwara ............. B21B 17/04
                                                                72/208
2009/0090153 A1* 4/2009 Marin .................... B21B 17/04
                                                                72/97

(Continued)

FOREIGN PATENT DOCUMENTS

JP        2002540437 A      11/2002
KR     20030028848 A       4/2003

(Continued)

OTHER PUBLICATIONS

International Search Report for PCT/KR2021/000509, mailed Apr. 26, 2021.
Written Opinion for PCT/KR2021/000509, mailed Apr. 26, 2021.

*Primary Examiner* — Teresa M Ekiert
(74) *Attorney, Agent, or Firm* — Renaissance IP Law Group LLP (57) ABSTRACT

The present inventive concept provides a method for manufacturing a multi-layered nuclear fuel cladding pipe, comprising the steps of: providing a preliminary cladding pipe in which an inner pipe having a rod-shaped insertion body inserted thereinto is disposed in an outer pipe; reducing the (Continued)

diameter of the preliminary cladding pipe by applying pressure from the outside to the inner side of the preliminary cladding pipe; and removing the insertion body from the inner pipe by providing a force in the direction in which the insertion body extends, wherein the inner pipe and the outer pipe may be formed of different metals from each other.

12 Claims, 4 Drawing Sheets

(56) References Cited

U.S. PATENT DOCUMENTS

| | | | |
|---|---|---|---|
| 2010/0064753 A1* | 3/2010 | Sasaki | B21B 17/04 |
| | | | 72/370.01 |
| 2016/0273683 A1* | 9/2016 | Silveira E Silva | B21C 37/154 |
| 2018/0233238 A1 | 8/2018 | Hackett et al. | |

FOREIGN PATENT DOCUMENTS

| | | |
|---|---|---|
| KR | 100963472 B1 | 6/2010 |
| KR | 20140147404 A | 12/2014 |
| KR | 101595436 B1 | 2/2016 |
| KR | 20180116972 A | 10/2018 |
| KR | 101941673 B1 | 1/2019 |
| WO | 2015111825 A1 | 7/2015 |

\* cited by examiner

METHOD FOR MANUFACTURING MULTI-LAYERED NUCLEAR FUEL CLADDING PIPE

TECHNICAL FIELD

The present disclosure relates to a method for manufacturing a multi-layered nuclear fuel cladding pipe, and more particularly, to the method for manufacturing the multi-layered nuclear fuel cladding pipe using a rod-shaped insertion body.

BACKGROUND ART

In general, a nuclear power plant generates steam by using heat generated from nuclear fission and produces electrical energy by turning a turbine with a power of the generated steam. The nuclear power plant includes multiple layers of protective barriers to prevent leakage of radioactive materials and protect a safety of the nuclear power plant. Among the protective barriers, a nuclear fuel cladding pipe that is a second protective barrier surrounds the nuclear fuel pellet to isolate a nuclear fuel causing nuclear fission from a coolant of a primary system circulating a nuclear reactor, thereby preventing fission products produced during the nuclear fission from being moved to the coolant of the primary system. Also, the nuclear fuel cladding pipe effectively transfer heat generated by the nuclear fission to the coolant of the primary system.

The nuclear fuel cladding pipe is easily oxidized by reacting with vapor ($H_2O$) at a high temperature, and this oxidation may be restricted or prevented by manufacturing a double structure nuclear fuel cladding pipe with different materials.

The double structure nuclear fuel cladding pipe is required to be manufactured without an interface between an outer pipe and an inner pipe. Typically, since the inner pipe does not sufficiently provide a force for supporting a pressure applied from the outside to the inner side, there is a limitation in that the outer pipe closely contacts the inner pipe.

SUMMARY

The present disclosure provides a method for manufacturing a multi-layered nuclear fuel cladding pipe, which inserts a rod-shaped insertion body into an inner pipe so that the inner pipe closely contacts an outer pipe.

In accordance with an exemplary embodiment, a method for manufacturing a multi-layered nuclear fuel cladding pipe includes: providing a preliminary cladding pipe in which an inner pipe into which a rod-shaped insertion body is inserted is disposed in an outer pipe; reducing a diameter of the preliminary cladding pipe by applying pressure from the outside to the inner side of the preliminary cladding pipe; and removing the insertion body from the inner pipe by providing a force in parallel to direction in which the insertion body extends, and the inner pipe and the outer pipe are formed of different metals from each other.

The reducing of the diameter of the preliminary cladding pipe may include moving the preliminary cladding pipe between a plurality of rollers pairing up with each other by arranging in a longitudinal direction of the preliminary cladding pipe a plurality of rolling units each including the plurality of rollers.

A distance between the plurality of rollers of each of the plurality of rolling units may be decreased by stages in the longitudinal direction of the preliminary cladding pipe, and in the moving of the preliminary cladding pipe between the plurality of rollers the pressure applied to the inner side of the preliminary cladding pipe may be gradually increased.

The plurality of rolling units may include: a first rolling unit in which the plurality of rollers are provided in a first direction; and a second rolling unit in which the plurality of rollers are provided in a second direction crossing the first direction, and the first rolling unit and the second rolling unit may be alternately arranged.

The insertion body may provide to the inner pipe a reaction force against the pressure in the reducing of the diameter of the preliminary cladding pipe.

The providing of the preliminary cladding pipe may include: polishing a surface of the insertion body or applying a lubricant to the surface of the insertion body; and inserting the insertion body into the inner pipe.

The insertion body may have elasticity.

The insertion body may be made of a polymer.

The insertion body may have hardness less than that of the inner pipe.

The insertion body may have hardness of 60 Shore A to 100 Shore D.

The insertion body may have a length greater than that of each of the inner pipe and the outer pipe.

An original diameter of the insertion body is equal to or less than an internal diameter of the inner pipe of the preliminary cladding pipe, and in the reducing of the diameter of the preliminary cladding pipe the internal diameter of the inner pipe may be reduced equal to or less than the original diameter of the insertion body.

The outer pipe may have ductility greater than that of the inner pipe.

ADVANTAGEOUS EFFECTS

In the method for manufacturing multi-layered nuclear fuel cladding pipe in accordance with the exemplary embodiment, as the rod-shaped insertion body is inserted into the inner pipe, and the diameter of the preliminary cladding pipe is reduced by applying the pressure from the outside to the inner side of the preliminary cladding pipe, the insertion body may provide to the inner pipe the reaction force against the pressure applied to the inner side. Through this, the inner pipe and the outer pipe may closely contact and be fixed to each other, and the multi-layered nuclear fuel cladding pipe may be manufactured by using one pipe without the interface between the inner pipe and the outer pipe.

Also, since the insertion body has the rod shape, the insertion body may be removed from the inner pipe by simply applying the force in the extension direction of the insertion body. When the insertion body has the elasticity, the insertion body may not damage the inner wall of the inner pipe. Also, since the insertion body is made of a polymer, the insertion body may have the sufficient hardness to provide to the inner pipe the sufficient reaction force against the pressure applied to the inner side.

And, as the swaging process is performed by passing the preliminary cladding pipe through the plurality of rolling units having the spaced distance between the rollers, which is reduced by stages, only the diameter of the preliminary cladding pipe may be reduced while the shape of the preliminary cladding pipe is maintained, and an excessive force may not be applied to the outer pipe and/or the inner pipe to prevent the damage and deformation of the outer pipe and/or the inner pipe. Also, when the plurality of rolling units are configured by alternately arranging the first rolling unit in which the plurality of rolling units are provided in the vertical direction and the second rolling unit in which the plurality of rolling units are provided in the horizontal direction, the swaging process may be performed while the preliminary cladding pipe maintains the circular shape instead of being dented in one direction of the vertical direction or the horizontal direction.

DETAILED DESCRIPTION

Hereinafter, specific embodiments will be described in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. In every possible case, like reference numerals are used for referring to the same or similar elements in the description and drawings. In the figures, the dimensions of layers and regions are exaggerated for clarity of illustration. Like reference numerals in the drawings denote like elements, and thus their description will be omitted.

Figure 1:
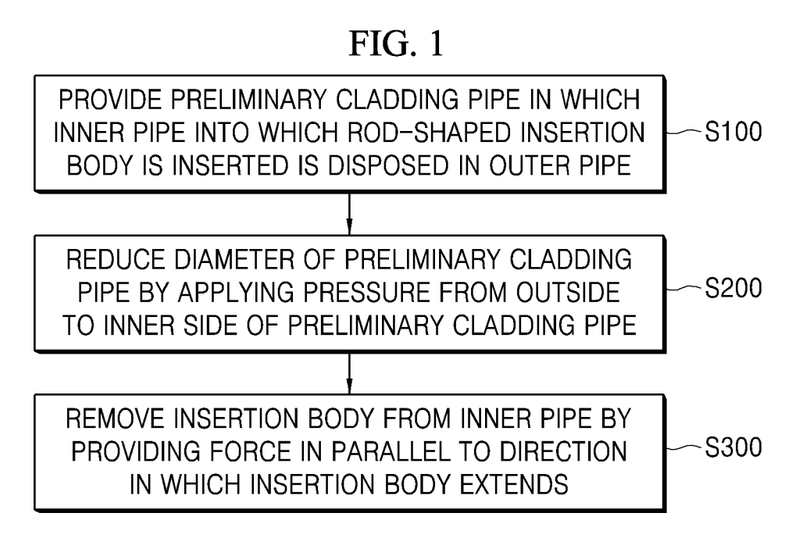
FIG. 1 is a flowchart representing a method for manufacturing a multi-layered nuclear fuel cladding pipe in accordance with an exemplary embodiment.
Figure 2:
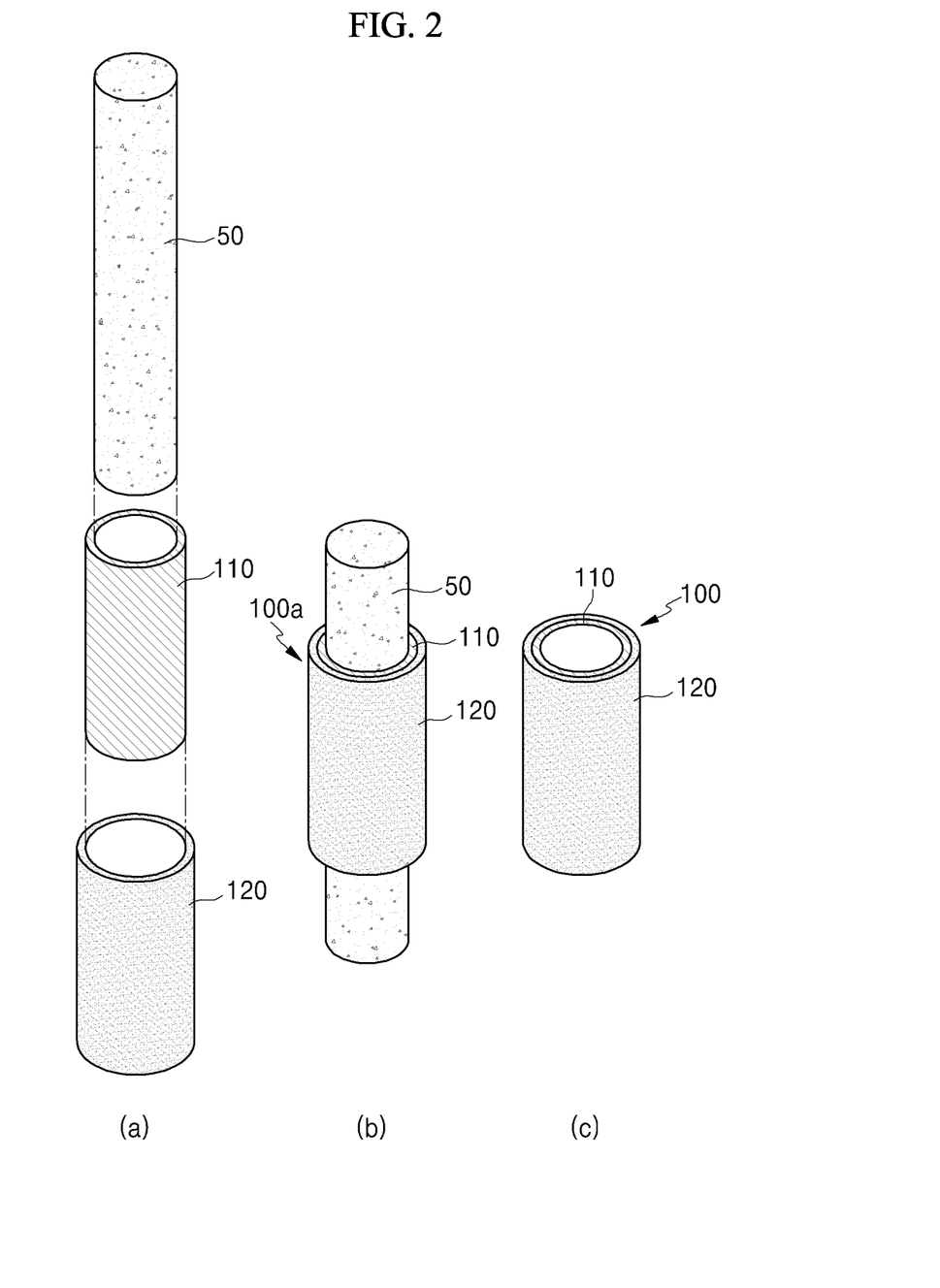
FIG. 2 is a view sequentially illustrating the method for manufacturing the multi-layered nuclear fuel cladding pipe in accordance with an exemplary embodiment.

FIG. 1 is a flowchart representing a method for manufacturing a multi-layered nuclear fuel cladding pipe in accordance with an exemplary embodiment, and FIG. 2 is a view sequentially illustrating the method for manufacturing the multi-layered nuclear fuel cladding pipe in accordance with an exemplary embodiment. Here, (a) of FIG. 2 is an exploded perspective view of a preliminary cladding pipe, (b) of FIG. 2 is a perspective view illustrating a coupled state of the preliminary cladding pipe, and (c) of FIG. 2 is a perspective view illustrating the multi-layered nuclear fuel cladding pipe. Referring to FIGS. 1 and 2, method for manufacturing the multi-layered nuclear fuel cladding pipe in accordance with an exemplary embodiment may include: a process S100 of providing a preliminary cladding pipe 100a in which an inner pipe 110 into which a rod-shaped insertion body 50 is inserted is disposed in an outer pipe 120; a process S200 of reducing a diameter of the preliminary cladding pipe 100a by applying pressure F in a direction from the outside to the inner side of the preliminary cladding pipe 100a; and a process S300 of removing the insertion body 50 from the inner pipe 110 by providing a force in parallel to direction in which the insertion body 50 extends.

Firstly, the preliminary cladding pipe 100a in which the inner pipe 110, into which the rod-shaped insertion body 50 is inserted, is disposed in the outer pipe 120 is provided in the process S100. The inner pipe 110 having the rod-shaped insertion body 50 may be disposed in the outer pipe 120, and through this, the preliminary cladding pipe 100a in which the insertion body 50 is inserted into the inner pipe 110 may be prepared. Here, the insertion body 50 may be inserted into the inner pipe 110 in a state in which the inner pipe 110 is disposed (or inserted) in the outer pipe 120, or the insertion body 50 may be firstly inserted into the inner pipe 110, and then the inner pipe 110 to which the insertion body 50 is inserted may be arranged in the outer pipe 120. Also, a plurality of preliminary cladding pipes 100a in which the insertion body 50 is inserted into the inner pipe 110 may be prepared by preparing a plurality of the preliminary cladding pipes 100a in which the inner pipe 110 is inserted into the outer pipe 120 and then inserting one long insertion body 50 (or consecutive inserts) into the inner pipe 110 of all of the plurality of the preliminary cladding pipes 100a. That is, the plurality of preliminary cladding pipes 100a may be sewn by one insertion body 50, and in this case, the insertion body 50 is inserted into the inner pipe 110 in the state in which the inner pipe 110 is inserted into the outer pipe 120.

Thereafter, the diameter of the preliminary cladding pipe 100a is reduced by applying the pressure F in the direction from the outside to the inner side of the preliminary cladding pipe 100a in the process S200. The diameter of the preliminary cladding pipe 100a may be reduced by applying the pressure F from the outside to the inner side in a radial direction of the preliminary cladding pipe 100a toward a central axis of the preliminary cladding pipe 100a, and through this, the inner pipe 110 and the outer pipe 120 may be tightly fixed to each other. Here, the insertion body 50 may provide a force supporting the inner pipe 110 against the pressure F applied in the direction from the outside to the inner side of the preliminary cladding pipe 100a.

That is, in the process S200 of reducing the diameter of the preliminary cladding pipe 100a, the outer pipe 120 and the inner pipe 110 may be tightly fixed to each other by the pressure F applied in the direction from the outside to the inner side of the preliminary cladding pipe 100a and the force of the insertion body 50 for supporting the inner pipe 110, and the multi-layered nuclear fuel cladding pipe 100 without a dented portion may be manufactured.

Thereafter, the insertion body 50 is removed from the inner pipe 110 by providing a force in parallel to the direction in which the insertion body 50 extends in the process S300. Since the rod-shaped insertion body 50 has one body, the insertion body 50 may be simply removed from the inner pipe 110 by providing the force to the insertion body 50 and/or the preliminary cladding pipe 100a in parallel to the extension direction of the insertion body 50 to remove the insertion body 50 from the inside of the inner pipe 110. Here, the insertion body 50 may be removed by pulling or pushing the insertion body 50. When the insertion body 50 is removed by pulling the insertion body 50, a pulling force may be applied to the insertion body 50 in the extension direction (along the extension direction or in parallel to the extension direction) of the insertion body 50, or a pushing force may be applied to the preliminary cladding pipe 100a in the extension direction (or in parallel to the extension direction) of the insertion body 50. On the contrary, when the insertion body 50 is removed by pushing the insertion body 50, a pushing force may be applied to the insertion body 50 in the extension direction of the insertion body 50, or a pulling force may be applied to the preliminary cladding pipe 100a in the extension direction of the insertion body 50.

Typically, a swaging process is performed in a state in which only the inner pipe 110 is inserted into the outer pipe 120, and the preliminary cladding pipe 100a has an empty pipe state. In case that the swaging process is performed by this method, when a force (or pressure) is radially applied, the inner pipe 110 may not receive a uniform force (or energy) and be dented, and thus the dented multi-layered nuclear fuel cladding pipe 100 is manufactured. To solve the above-described limitation, a method of performing the swaging process by using salt such as KOH as a filling material and filling the filling material into the inner pipe 110 and then melting and removing the filling material by a solvent such as water is also used. In this method, a person directly fills the filling material in the form of granules or powder into the inner pipe 110, and then the filled inner pipe 110 is pushed by using a long rod to apply a pressure thereto, thereby increasing a density thereof. Through this, a uniform amount of the filling material (i.e., salt) inserted into the inner pipe 110 may not be secured, and reproducibility may not be secured. Substantially, the method of using the salt as the filling material is not efficient in the swaging process that is for mass production and is inefficient in terms of time due to a long process time thereof. Thus, this method is not suitable for an ultimate purpose of simple and fast swaging process. Particularly, more time is required to remove the condensed filling material after the swaging process. When the filling material is a lumpy solid like granules, the diameter of the inner pipe 110 may be reduced, and the inner surface (or inner wall) of the inner pipe 110 may be scratched. When a power-type filling material is used in case that the inner pipe 110 has ductility (or elasticity), the inner pipe 110 may be expanded (or deformed) whenever a pressure is applied to the filling material to increase the density, and the density of the filling material may be varied for each position. Also, both ends of the preliminary cladding pipe 100a are required to be shielded (or closed) so that the filling material is not escaped to the outside during the swaging process. When the both ends of the preliminary cladding pipe 100a are not tightly closed, as an internal pressure of the inner pipe 110 is increased by the pressure F for reducing the preliminary cladding pipe 100, the filling material may be escaped to the outside by breaking the shielding of the both ends of the preliminary cladding pipe 100a. Also, when the both ends of the preliminary cladding pipe 100a are extremely tightly closed, as preliminary cladding pipe 100a is not smoothly compressed, the diameter of the preliminary cladding pipe 100a may not be easily reduced, or the inner pipe 110 and the outer pipe 120 may not closely contact each other.

However, since the rod-shaped insertion body 50 is only pulled or pushed in an exemplary embodiment, the insertion body 50 may be removed from the inner pipe 110 easier and faster than the case in which the salt is used as the filling material, and a production speed of the multi-layered nuclear fuel cladding pipe 100 may be improved.

Here, the inner pipe 110 and the outer pipe 120 may be formed of different metals (or metal alloys) from each other. For example, the inner pipe 110 may be made of a zirconium alloy (e.g., zircaloy-4) and have a hollow pipe shape having an accommodation space (or hollow part) in which a nuclear fuel pellet is accommodated as the both ends are penetrated in one direction (or longitudinal direction). The inner pipe 110 may be inserted into the outer pipe 120 and disposed at an innermost portion of multi-layered nuclear fuel cladding pipe 100.

The outer pipe 120 may be made of metal (e.g., metal containing aluminum) different from the zirconium alloy of the inner pipe 110. The outer pipe 120 may be made of metal having an excellent corrosion resistance (e.g., an aluminum alloy such as aluminum, Cr-Al, and FeCrAl) and prevent the inner pipe 110 from reacting with high temperature moisture to produce hydrogen under a high temperature and high pressure atmosphere. Also, the nuclear fuel pellet disposed in the accommodation space of the inner pipe 110 may be protected from high temperature oxidation to increase nuclear operation stability. Here, the outer pipe 120 may have a hollow pipe shape having an accommodation space (or hollow part) as the both ends are penetrated in one direction so that the inner pipe 110 is inserted and accommodated therein.

The hydrogen explosion occurring in a nuclear power plant is closely related to the oxidation properties of zirconium. When the outer pipe 120 is made of different metal excluding zirconium to surround an outer portion of the inner pipe 110, the outer pipe 120 may have improved oxidation resistance against a coolant member. Thus, oxidation and corrosion of the inner pipe 110 may be prevented in case of an accident situation.

Thus, the multi-layered nuclear fuel cladding pipe 100 manufactured by using only advantageous aspects of the inner pipe 110 and the outer pipe 120 may have an improved mechanical strength and also effectively reduce the risk of an accident caused by high temperature oxidation. Also, the inner pipe 110 and/or the nuclear fuel accommodated in the inner pipe 110 may be protected against a nuclear reactor accident to allow a stable operation of nuclear power.

Figure 3:
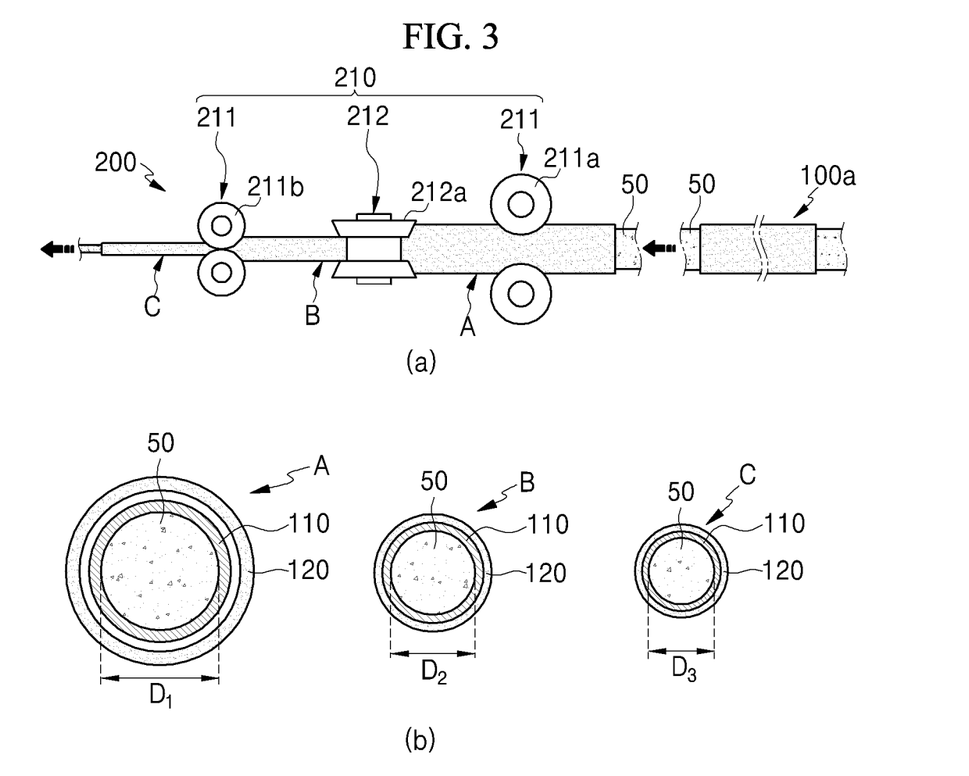
FIG. 3 is a view for explaining a swaging process in accordance with an exemplary embodiment.

FIG. 3 is a view for explaining the swaging process in accordance with an exemplary embodiment, (a) of FIG. 3 is a view illustrating a swaging machine including a plurality of rolling units, and (b) of FIG. 3 is a view illustrating a diameter variation of the preliminary cladding pipe according to portions.

Referring to FIG. 3, the process S200 of reducing the diameter of the preliminary cladding pipe 100a may include a process S210 of moving the preliminary cladding pipe 100a between a plurality of rollers 211a, 211b, and 212a pairing up with each other, by arranging in a longitudinal direction of the preliminary cladding pipe 100a a plurality of rolling units 210 each including the plurality of rollers 211a, 211b, and 212a.

The preliminary cladding pipe 100a may be moved between the plurality of rollers 211a, 211b, and 212a by arranging in the longitudinal direction of the preliminary cladding pipe 100a the plurality of rolling units 210 each including the plurality of rollers 211a, 211b, and 212a pairing up with each other, to reduce the diameter of the preliminary cladding pipe 100a in the process S210. A swaging machine 200 may reduce the diameter of the preliminary cladding pipe 100a and increase the length of the preliminary cladding pipe 100a through compression and drawing by compressing an outer portion of the preliminary cladding pipe 100a using the rollers 211a, 211b, and 212a and reduce a (spaced) distance between the inner pipe 110 and the outer pipe 120 so that the inner pipe 110 and the outer pipe 120 are tightly fixed to each other. That is, the swaging machine 200 may increase the length of the preliminary cladding pipe 100a or reduce the diameter of the preliminary cladding pipe 100a through the plurality of rollers 211a, 211b, and 212a and apply the pressure F from the outside of the preliminary cladding pipe 100a so hat the inner pipe 110 and the outer pipe 120 closely contact each other. Here, the swaging machine 200 may include a plurality of rolling units 210 arranged in the longitudinal direction of the preliminary cladding pipe 100a. Each of the plurality of rolling units 210 may include the plurality of rollers 211a, 211b, and 212a each forming a pair, and the plurality of rollers 211a, 211b, and 212a each forming a pair may press the preliminary cladding pipe 100a symmetrically (or uniformly) toward a central axis of the preliminary cladding pipe 100*a* from the outside. Here, the plurality of rollers each forming a pair may be one pair of rollers facing each other or a roller group in which a plurality of rollers are spaced by a predetermined angle from each other around the central axis of the preliminary cladding pipe 100*a*.

When the plurality of rolling units 210 are arranged in the longitudinal direction of the preliminary cladding pipe 100*a*, and the preliminary cladding pipe 100*a* is moved to pass between the plurality of rollers 211*a*, 211*b*, and 212*a*, the preliminary cladding pipe 100*a* may be compressed and drawn by the force of the plurality of rollers 211*a*, 211*b*, and 212*a* compressing the preliminary cladding pipe 100*a*, the length of the preliminary cladding pipe 100*a* may be increased, or the diameter of the preliminary cladding pipe 100*a* may be reduced, and the inner pipe 110 and the outer pipe 120 may closely contact each other.

Also, the distance between the plurality of rollers 211*a*, 211*b*, and 212*a* in the plurality of rolling units 210 may be decreased by stages along the longitudinal direction of the preliminary cladding pipe 100*a*, and in the process S210 of moving the preliminary cladding pipe 100*a* between the plurality of rollers 211*a*, 211*b*, and 212*a*, the pressure F applied to the inner side of the preliminary cladding pipe 100*a* may be gradually increased. The plurality of rolling units 210 may be spaced apart from each other based on the longitudinal direction (i.e., one direction) of the preliminary cladding pipe 100*a*. As each of the plurality of rolling units 210 includes the plurality of rollers 211*a*, 211*b*, and 212*a* each forming a pair to contact an outer surface of the preliminary cladding pipe 100*a* with the preliminary cladding pipe 100*a* therebetween, and the preliminary cladding pipe 100*a* is moved between the plurality of rollers 211*a*, 211*b*, and 212*a* pairing up with each other, the pushing pressure F may be applied from the outside to the inner side in the radial direction of the preliminary cladding pipe 100*a*. As the distance between the plurality of rollers 211*a*, 211*b*, and 212*a* is decreased by stages, the diameter (or size) of the roller may be also reduced according to diameter reduction of the preliminary cladding pipe 100*a*. As illustrated in (a) of FIG. 3, a first horizontal roller 212*a* may have a diameter less than that of a first vertical roller 211*a*, and a second vertical roller 211*b* may have a diameter less than that of the first horizontal roller 212*a*.

For example, each of the plurality of rollers 211*a*, 211*b*, or 212*a* each forming a pair may face and contact the outer surface of the preliminary cladding pipe 100*a* based on the preliminary cladding pipe 100*a*. When the preliminary cladding pipe 100*a* is not provided between the plurality of rollers 211*a*, 211*b*, or 212*a* pairing up with each other because the preliminary cladding pipe 100*a* because the preliminary cladding pipe 100*a* is not moved between the plurality of rollers 211*a*, 211*b*, or 212*a* pairing up with each other, a spaced distance of each of the plurality of rollers 211*a*, 211*b*, or 212*a* may be equal to or less than an outer diameter (or external diameter) of the preliminary cladding pipe 100*a*, and a plurality of rollers 211*a* pairing up with each other disposed at the very first position may have a spaced distance equal to or slightly less than the external diameter of the preliminary cladding pipe 100*a*. Thus, when the preliminary cladding pipe 100*a* passes between the plurality of rollers 211*a*, 211*b*, or 212*a* pairing up with each other, the diameter of the preliminary cladding pipe 100*a* may be reduced, or the inner pipe 110 and the outer pipe 120 may closely contact each other by the pressure F applied from the plurality of rollers 211*a*, 211*b*, or 212*a* pairing up with each other to the outer surface of the preliminary cladding pipe 100*a*.

Here, as illustrated in (a) of FIG. 3, the spaced distance between the plurality of rollers 211*a*, 211*b*, or 212*a* of each of the plurality of rolling units 210 may be decreased by stages in the longitudinal direction of the preliminary cladding pipe 100*a*. When positions of the preliminary cladding pipe 100*a* passing each of the plurality of rolling units 210, at which the spaced distances between the plurality of rollers 211*a*, 211*b*, or 212*a* are decreased by stages, are classified into A, B, and C, and diameters and thicknesses of the positions A, B, and C of the preliminary cladding pipe 100*a* are checked, the diameter of the preliminary cladding pipe 100*a* and/or the diameter (or internal diameter) of the accommodation space of the inner pipe 110 may be gradually decreased from D1 to D3 as the number of the plurality of rolling units 210 through which the preliminary cladding pipe 100*a* passes is increased as in (b) of FIG. 3. This is because as the spaced distance between the plurality of rollers 211*a*, 211*b*, or 212*a* of each of the plurality of rolling units 210 is decreased by stages, the pressure F applied to the preliminary cladding pipe 100*a* is gradually increased, and as the preliminary cladding pipe 100*a* is deformed by the pressure F that is gradually increased, the diameter of the preliminary cladding pipe 100*a* and/or the diameter of the accommodation space of the inner pipe 110 is decreased. That is, the pressure F applied to the inner side of the preliminary cladding pipe 100*a* may be gradually increased as the preliminary cladding pipe 100*a* passes the plurality of rollers 211*a*, 211*b*, or 212*a* each having the gradually decreasing spaced distance in the process S210 of moving the preliminary cladding pipe 100*a* between the plurality of rollers 211*a*, 211*b*, or 212*a*.

Thus, in an exemplary embodiment, only the diameter of the preliminary cladding pipe 100*a* may be reduced while maintaining a shape of the preliminary cladding pipe 100*a* by performing the swaging process of allowing the preliminary cladding pipe 100*a* to pass through the plurality of rolling units 210 in which the spaced distance of each of the plurality of rollers 211*a*, 211*b*, or 212*a* each forming a pair is decreased by stages. Also, an excessive force may not be applied to the outer pipe 120 and/or the inner pipe 110, and the outer pipe 120 and/or the inner pipe 110 may not be damaged (or broken) and deformed.

Here, although three rolling units 210 are provided, and each of the rolling units 211 and 212 include two rollers 211*a*, 211*b*, or 212*a* in (a) of FIG. 3, the exemplary embodiment is not limited to the number of each of the rollers 211*a*, 211*b*, or 212*a* and the rolling units 210. For example, the number of each of the rollers 211*a*, 211*b*, or 212*a* and the rolling units 210 may be variously changed. Also, although the diameter of the preliminary cladding pipe 100*a* is greatly reduced in (b) of FIG. 3, this is merely illustrative for explaining a variation of the diameter. When the preliminary cladding pipe 100*a* is substantially made of a soft (or flexible) material, the diameter of the preliminary cladding pipe 100*a* may be varied as in (b) of FIG. 3 or decreased according to an elongation rate of the outer pipe 120 and the inner pipe 110.

When the method of tightly fixing the outer pipe 120 and inner pipe 110 to each other by increasing a close contact force of the outer pipe 120 and inner pipe 110 through the swaging process is described in more detail with reference to (a) of FIG. 3, the pressure F is applied to the inner side of the preliminary cladding pipe 100*a* by the pressure F applied from the rollers 211*a*, 211*b*, or 212*a* to the preliminary cladding pipe 100a while the preliminary cladding pipe 100a passes between the plurality of rollers 211a, 211b, or 212a. Here, since the insertion body 50 inserted into the inner pipe 110 of the preliminary cladding pipe 100a is filled in the accommodation space of the inner pipe 110, the inner pipe 100 may sustain the pressure F applied to the inner side thereof. That is, since the insertion body 50 has a force supporting the inner pipe 110 against the pressure F applied from the outside, the outer pipe 120 and inner pipe 110 may be tightly fixed to each other such that the inner pipe 110 is disposed at a predetermined position, and the outer pipe 120 is greatly contracted more than the inner pipe 110 by the external force F and retracted toward the inner pipe 110.

The plurality of rolling units 210 may include: a first rolling unit 211 in which the plurality of rollers 211a and 211b are provided in a first direction (e.g., vertical direction); and a second rolling unit 212 in which the plurality of rollers 212a is provided in a second direction (e.g., horizontal direction) crossing the first direction. The first rolling unit 211 and the second rolling unit 212 may be alternately arranged. That is, the plurality of rolling units 210 may be configured such that the first rolling unit 211 in which the plurality of rollers 211a and 211b are provided in the first direction and the second rolling unit 212 in which the plurality of rollers 212a is provided in the second direction are alternately arranged. The first rolling unit 211 may include the plurality of rollers 211a and 211b provided in the first direction, and the plurality of rollers 211a and 211b may be arranged outside the preliminary cladding pipe 100a and symmetric with respect to the preliminary cladding pipe 100a disposed therebetween. For example, one pair of rollers 211a or 211b may be arranged to face each other to both sides in the first direction based on the preliminary cladding pipe 100a disposed therebetween, and the one pair of rollers 211a or 211b facing each other in the first direction may press the preliminary cladding pipe 100a from the both sides of the first direction to the inner side of the preliminary cladding pipe 100a.

The second rolling unit 212 may include the plurality of rollers 212a provided in the second direction crossing the first direction, and the plurality of rollers 212a may be arranged outside the preliminary cladding pipe 100a and symmetric with respect to the preliminary cladding pipe 100a disposed therebetween. For example, one pair of rollers 212a may be arranged to face each other to both sides in the second direction based on the preliminary cladding pipe 100a disposed therebetween, and the one pair of rollers 212a facing each other in the second direction may press the preliminary cladding pipe 100a from the both sides of the second direction to the inner side of the preliminary cladding pipe 100a.

Here, the first rolling unit 211 and the second rolling unit 212 may be alternately arranged.

When only the first rolling unit 211 or the second rolling unit 212 is consecutively arranged, as the preliminary cladding pipe 100a is compressed only in one direction (e.g., vertical direction or horizontal direction), the entire preliminary cladding pipe 100a may not be uniformly compressed (or contracted), and the entire preliminary cladding pipe 100a may not maintain a shape (or cross-sectional shape) thereof and be dented in one direction (vertical or horizontal direction). However, when the first rolling unit 211 in which the plurality of rollers 211a and 211b are provided in the first direction and the second rolling unit 212 in which the plurality of rollers 212a is provided in the second direction are alternately arranged, the preliminary cladding pipe 100a may be compressed even in the second direction in addition to the first direction, and thus, the preliminary cladding pipe 100a may be uniformly compressed in all directions (or in both directions). Thus, the swaging process may be performed while the preliminary cladding pipe 100a maintains the circular shape instead of being dented in one direction (vertical or horizontal direction).

Here, the rolling unit 211 or 212 in which the plurality of rollers 211a and 211b are provided in the vertical direction may be firstly arranged among the first rolling unit 211 and the second rolling unit 212, and the preliminary cladding pipe 100a may be firstly entered between the rolling unit 211 or 212 provided in the vertical direction. When a main diameter (or original diameter) of the insertion body 50 is less than the internal diameter of the inner pipe 110 so that the insertion body 50 is easily inserted into the inner pipe 110, the insertion body 50 may be deflected downward by the gravity, and thus the insertion body 50 may be difficult to be positioned at an inner center of the inner pipe 110. Here, the main diameter may be an original diameter when an external force such as a pressure or a tensile strength is not applied. In this case, when the first rolling unit 211 or the second rolling unit 212 in which the rolling unit 212 or 211 is provided in the horizontal direction firstly compresses the preliminary cladding pipe 100a, as a horizontal directional width of the inner pipe 110 may be reduced, the insertion body 50 is fixed in a state of being reflected downward, and as the insertion body 50 is not disposed at the inner center in the inner pipe 110, the preliminary cladding pipe 100a may be dented in one direction.

However, when the rolling unit 211 or 212 provided in the vertical direction firstly compresses the preliminary cladding pipe 100a, as a vertical position of the insertion body 50 is coincided (or aligned) to the inner center of the inner pipe, the insertion body 50 may be disposed at the inner center of the inner pipe, and the preliminary cladding pipe 100a may maintain the circular shape instead of being dented in one direction.

Figure 4:
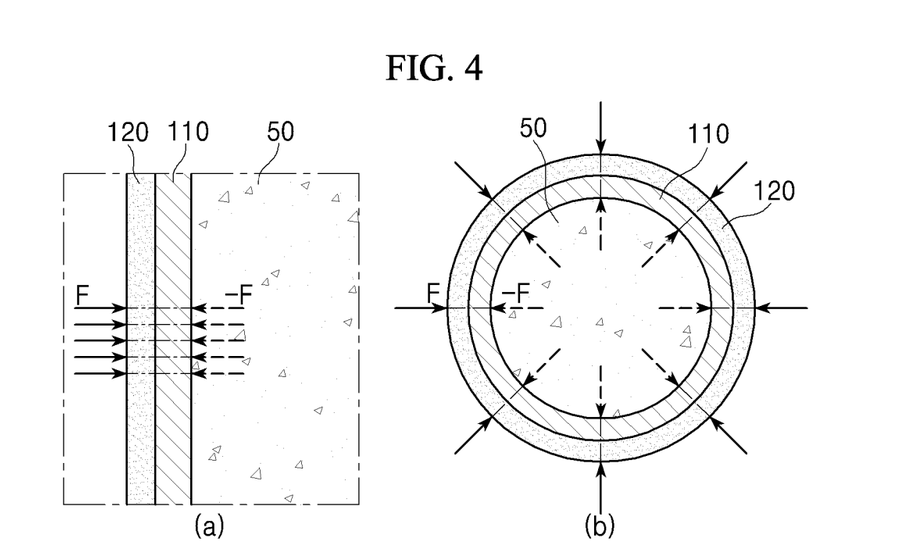
FIG. 4 is a conceptual view for explaining a reaction force caused by an insertion body in accordance with an exemplary embodiment.

FIG. 4 is a conceptual view for explaining a reaction force caused by the insertion body in accordance with an exemplary embodiment, (a) of FIG. 4 is a side cross-sectional view of the preliminary cladding pipe, and (b) of FIG. 4 is a cross-sectional view of the preliminary cladding pipe.

Referring to FIG. 4, the insertion body 50 may provide a reaction force -F against the pressure F toward the inner pipe 110, in the process S200 of reducing the diameter of the preliminary cladding pipe 100a. The insertion body 50 may provide to the inner pipe 110 the reaction force -F against the pressure F applied to the inner side. Through this, the inner pipe 110 and the outer pipe 120 may closely contact each other, and the multi-layered nuclear fuel cladding pipe 100 may include one pipe without an interface between the inner pipe 110 and the outer pipe 120.

That is, since the insertion body 50 is filled in the accommodation space of the inner pipe 110, the insertion body 50 may support the inner pipe 110 when the diameter of the preliminary cladding pipe 100a is reduced (or contracted) by the pressure F applied to the inner side in the swaging process and provide the reaction force -F in a radial direction (or outward direction) against the pressure F. As the outer pipe 120 is compressed toward the inner pipe 110 by the pressure F, and the inner pipe 110 is compressed toward the outer pipe 120 by the reaction force -F, the inner pipe 110 and the outer pipe 120 may closely contact each other. Also, the inner pipe 110 and the outer pipe 120 may closely contact and be fixed to each other as one pipe without the interface therebetween by the sufficient pressure F and reaction force -F. Also, while the diameter of the inner pipe is almost not varied by the reaction force -F due to the insertion body 50, the outer pipe 120 may be relatively greatly contracted, and thus the inner pipe 110 and the outer pipe 120 may closely contact each other.

The process S100 of preparing the preliminary cladding pipe may include: a process S110 of polishing a surface of the insertion body 50 or applying a lubricant to the surface of the insertion body 50; and a process S120 of inserting the insertion body 50 into the inner pipe 110.

The surface of the insertion body 50 may be polished, or the lubricant may be applied to the surface of the insertion body 50 in the process S110. The surface of the insertion body 50 may be polished so that the insertion body 50 is smoothly inserted into the inner pipe 110 and smoothly removed from the inner pipe 110, or the lubricant may be applied (spread) on the surface of the insertion body 50. Here, the method for manufacturing the multi-layered nuclear fuel cladding pipe in accordance with an exemplary embodiment may be performed at the room temperature (about 0° C. to 25° C.), and the lubricant may include cooking oil or lubricating rust (e.g., WD-40), which is easy to buy, instead of high price high temperature lubricant or heat resistant lubricant.

Also, when the surface of the insertion body 50 is smoothly polished, and the lubricant is applied to the surface of the insertion body 50, the inner surface of the inner pipe 110 may not be scratched by a rough surface of the insertion body 50, damage and/or deformation of the inner pipe 110 may be restricted or prevented as friction between the inner surface of the inner pipe 110 and the surface of the insertion body 50 is reduced.

That is, when the insertion body 50 has a rough surface, the inner surface of the inner pipe 110 may be scratched by the rough surface of the insertion body 50, and the inner pipe 110 may be torn or damaged by the friction between the inner surface of the inner pipe 110 and the surface of the insertion body 50. Also, a defect may be generated in the inner pipe 110. However, the above-described limitation may be solved by polishing the surface of the insertion body 50 smoothly or applying the lubricant to the surface of the insertion body 50.

Also, the insertion body 50 may be inserted into the inner pipe 110 in the process S120. The insertion body 50 may be inserted into the inner pipe 110 after the surface of the insertion body 50 is smoothly polished or the lubricant is applied to the surface of the insertion body 50 so that the insertion body 50 is smoothly inserted into the inner pipe 110. In this case, the insertion body 50 inserted into the inner pipe 110 may be easily escaped from the inner pipe 110 by the smooth surface of the insertion body 50 and/or the lubricant. Here, the inner pipe 110 to which the insertion body 50 is inserted may be inserted (or disposed) into the outer pipe 120 after the insertion body 50 is firstly inserted into the inner pipe 110, or the insertion body 50 may be inserted into the inner pipe 110 disposed (or inserted) in the outer pipe 120.

The insertion body 50 may have elasticity. When the insertion body 50 has elasticity, the insertion body 50 may be removed from the inner pipe 110 by simply applying a force in the extension direction of the insertion body 50 (i.e., pulling the insert) even when the internal diameter of the inner pipe 110 is reduced less than the original diameter of the insertion body 50 in the process S200 of reducing the diameter of the preliminary cladding pipe 100a. Also, the insertion body 50 having elasticity may apply a buffering force when the diameter of the inner pipe 110 is reduced to restrict or prevent an excessive force applied to the inner pipe 110 and effectively provide the reaction force -F by the elasticity.

When the insertion body 50 has elasticity, the inner wall of the inner pipe 110 may not be damaged while the insertion body 50 is inserted and removed. Also, since the elastic force is applied when the entire inner surface of the inner pipe 110 contacts the outer surface of the insertion body 50, when the original diameter of the insertion body 50 is less than the internal diameter of the inner pipe 110, the reaction force -F may not be almost applied until the internal diameter of the inner pipe 110 is reduced as same as a different between the internal diameter of the inner pipe 110 and the original diameter of the insertion body 50. Thus, as the inner surface of the inner pipe 110 contacts the outer surface of the insertion body 50 as the internal diameter of the inner pipe is reduced, the insertion body 50 may be disposed concentrically with the preliminary cladding pipe 100a (i.e., a cross-section of the insertion body forms a concentric axis with a (inner) circumference of the inner pipe) and disposed at the center of the inner pipe 110. Here, the inner pipe 110 and the outer pipe 120 may also form a concentric axis, and as the reaction force -F is applied (or provided) in a state in which the inner pipe 110 and the outer pipe 120 form the concentric axis, the inner pipe 110 and the outer pipe 120 may be tightly fixed to each other, and the multi-layered nuclear fuel cladding pipe 100 (including one pipe) in which the inner pipe 110 and the outer pipe 120 form the concentric axis may be manufactured.

Also, the insertion body 50 may be made of a polymer. The insertion body 50 is required to have sufficient hardness so that the insertion body 50 is not excessively compressed and effectively provides the reaction force -F to the inner pipe 110. When the insertion body 50 is made of a polymer, the insertion body 50 may have elasticity (or ductility) and also have sufficient hardness due to a high density of particles (or molecules). Accordingly, the inner pipe may provide the sufficient reaction force -F to the pressure F applied to the inner side of the inner pipe 110. For example, the insertion body 50 may be made of polyacetal, polyoxymethylene (POM), polyetheretherketone (PEEK), polyamide), nylon (e.g., nylon 6/6), ethylene vinyl acetate (EVA), thermoplastic for a glue gun, or rubber. Also, the insertion body 50 may have hardness less than that of the inner pipe 110. When the insertion body 50 has hardness greater than that of the inner pipe 110, as the diameter of the inner pipe 110 is reduced by the pressure F applied to the inner side, but the diameter of the insertion body 50 is not varied, the internal diameter of the inner pipe may not be reduced to burden the inner pipe 110. Accordingly, the inner pipe 110 may be damaged, e.g., a crack is generated in the inner pipe 110. When the insertion body 50 has the same hardness as that of the inner pipe 110, as the surface of the insertion body 50 closely contacts the inner surface of the inner pipe 110 by the pressure F applied to the inner side, the insertion body 50 may not be removed, or the insertion body 50 may be broken while being removed.

Here, the insertion body 50 may have hardness of 60 Shore A to 100 Shore D. When the insertion body 50 has the hardness less than 60 Shore A, since the insertion body 50 is excessively soft, the diameter of the insertion body 50 is reduced and the length of the insertion body 50 is increased by the pressure F applied to the inner side, and the insertion body 50 may not provide the reaction force -F against the applied pressure F. Also, since the insertion body 50 is excessively soft, the insertion body 50 may be broken while pulling the insertion body 50 to remove the insertion body 50 from the inner pipe 110.

However, when the insertion body 50 has the hardness less than 60 Shore A, since the insertion body 50 is excessively rigid, the insertion body 50 may not be removed in case that the diameter of the inner pipe is reduced, and the inner surface of the inner pipe closely contacts the surface of the insertion body 50, and as brittleness is increased, a portion of the insertion body 50 may be broken and remained in the inner pipe 110. Also, the insertion body 50 may not provide the reaction force -F caused by elasticity thereof because the elasticity is weakened.

Also, the insertion body 50 may have a length greater than that of each of the inner pipe 110 and the outer pipe 120. That is, the insertion body 50 may have a length greater than that of the preliminary cladding pipe 100*a*. When the insertion body 50 has a length greater than that of each of the inner pipe 110 and the outer pipe 120, the inert may be simply removed by pulling a portion of the insertion body 50, which is protruding (or exposed) from the preliminary cladding pipe 100*a*. Also, when the insertion body 50 has a diameter less than that of the inner pipe 110, the insertion body 50 may be positioned at the inner center of the inner pipe 110 by supporting the protruding (or exposed) portion, and the swaging process may be performed in a state in which the insertion body 50 is disposed at the inner center of the inner pipe 110. Also, the swaging process may be consecutively performed as a plurality of preliminary cladding pipes 100*a* are sewn to one long insertion body 50 by increasing the length of the insertion body 50, and as the insertion body 50 between the plurality of preliminary cladding pipes 100*a* that has undergone the swaging process is cut, the individually cut inserts 50 may be removed from the inner pipe 110.

Also, the original diameter of the insertion body 50 may be equal to or less than the internal diameter of the inner pipe 110 of the preliminary cladding pipe 100*a*, and in the process S200 of reducing the diameter of the preliminary cladding pipe 100*a*, the internal diameter of the inner pipe 110 may be reduced equal to or less than the original diameter of the insertion body 50. The original diameter of the insertion body 50 may be equal to or less than the internal diameter of the inner pipe 110 of the preliminary cladding pipe 100*a* so that the insertion body 50 is easily inserted into the inner pipe 110. Also, as the internal diameter of the inner pipe 110 is reduced equal to or less than the original diameter of the insertion body 50 in the process S200 of reducing the diameter of the preliminary cladding pipe 100*a*, the reaction force -F caused by the insertion body 50 may be sufficiently transmitted to the inner pipe 110, and the inner pipe 110 and the outer pipe 120 may closely contact and be tightly fixed to each other.

Also, the outer pipe 120 may have ductility greater than that of the inner pipe 110. The outer pipe 120 may have the ductility greater than that of the inner pipe 110 so that the outer pipe 120 closely contacts the outer surface of the inner pipe 110 during the swaging process, and thus the space d distance between the outer pipe 120 and the inner pipe 110 may be minimized so that the inner pipe 110 and the outer pipe 120 closely contact each other. That is, when the outer pipe 120 has the ductility greater than that of the inner pipe 110, the outer pipe 120 may closely contact the outer surface of the inner pipe 110 while the pressure is applied to the preliminary cladding pipe 100*a*. Since the outer pipe 120 having the ductility greater than that of the inner pipe 110 has sufficient ductility more than the inner pipe 110, the spaced distance to the inner pipe 110 may be minimized, and the inner pipe 110 and the outer pipe 120 may closely contact and be tightly fixed to each other.

Thus, the outer pipe 120 may be greatly contracted more than the inner pipe 110 in the process S200 of reducing the diameter of the preliminary cladding pipe 100*a* and closely contact and fixed with the inner pipe 100.

As described above, in an exemplary embodiment, as the rod-shaped insertion body is inserted into the inner pipe, and the diameter of the preliminary cladding pipe is reduced by applying the pressure from the outside to the inner side of the preliminary cladding pipe, the insertion body may provide to the inner pipe the reaction force against the pressure applied to the inner side. Through this, the inner pipe and the outer pipe may closely contact and be fixed to each other, and the multi-layered nuclear fuel cladding pipe may be manufactured by using one pipe without the interface between the inner pipe and the outer pipe. Also, since the insertion body has the rod shape, the insertion body may be removed from the inner pipe by simply applying the force in the extension direction of the insertion body. When the insertion body has the elasticity, the insertion body may not damage the inner wall of the inner pipe. Also, since the insertion body is made of a polymer, the insertion body may have the sufficient hardness to provide to the inner pipe the sufficient reaction force against the pressure applied to the inner side. Also, as the swaging process is performed by passing the preliminary cladding pipe through the plurality of rolling units having the spaced distance between the rollers, which is reduced by stages, only the diameter of the preliminary cladding pipe may be reduced while the shape of the preliminary cladding pipe is maintained, and an excessive force may not be applied to the outer pipe and/or the inner pipe to prevent the damage and deformation of the outer pipe and/or the inner pipe. Also, when the plurality of rolling units are configured by alternately arranging the first rolling unit in which the plurality of rolling units are provided in the vertical direction and the second rolling unit in which the plurality of rolling units are provided in the horizontal direction, the swaging process may be performed while the preliminary cladding pipe maintains the circular shape instead of being dented in one direction of the vertical direction or the horizontal direction.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed. Hence, the real protective scope of the present inventive concept shall be determined by the technical scope of the accompanying claims.

The invention claimed is:

1. A method for manufacturing a multi-layered nuclear fuel cladding pipe, comprising:
    providing a preliminary cladding pipe in which an inner pipe, into which a rod-shaped insertion body is inserted, is disposed in an outer pipe;
    reducing a diameter of the preliminary cladding pipe by applying pressure from outside the preliminary cladding pipe to an inner side of the preliminary cladding pipe; and
    removing the insertion body from the inner pipe by providing a force in parallel to direction in which the insertion body extends,
    wherein the inner pipe and the outer pipe are formed of different metals from each other, wherein the reducing of the diameter of the preliminary cladding pipe comprises moving the preliminary cladding pipe between a plurality of rollers pairing up with each other, by arranging in a longitudinal direction of the preliminary cladding pipe a plurality of rolling units each comprising the plurality of rollers, and in the reducing of the diameter of the preliminary cladding pipe, the outer pipe and the inner pipe are tightly fixed to each other to manufacture the multi-layered nuclear fuel cladding pipe.

2. The method of claim 1, wherein a distance between the plurality of rollers of each of the plurality of rolling units is decreased by stages in the longitudinal direction of the preliminary cladding pipe, and in the moving of the preliminary cladding pipe between the plurality of rollers, the pressure applied to the inner side of the preliminary cladding pipe is gradually increased.

3. The method of claim 1, wherein the plurality of rolling units comprise:

a first rolling unit in which the plurality of rollers are provided in a first direction; and a second rolling unit in which the plurality of rollers are provided in a second direction crossing the first direction, wherein the first rolling unit and the second rolling unit are alternately arranged.

4. The method of claim 1, wherein the insertion body provides to the inner pipe a reaction force against the pressure, in the reducing of the diameter of the preliminary cladding pipe.

5. The method of claim 1, wherein the providing of the preliminary cladding pipe comprises:

polishing a surface of the insertion body or applying a lubricant to the surface of the insertion body; and inserting the insertion body into the inner pipe.

6. The method of claim 1, wherein the insertion body has elasticity.

7. The method of claim 1, wherein the insertion body is made of a polymer.

8. The method of claim 1, wherein the insertion body has hardness less than that of the inner pipe.

9. The method of claim 8, wherein the insertion body has hardness of 60 Shore A to 100 Shore D.

10. The method of claim 1, wherein the insertion body has a length greater than that of each of the inner pipe and the outer pipe.

11. The method of claim 1, wherein an original diameter of the insertion body is equal to or less than an internal diameter of the inner pipe of the preliminary cladding pipe, and in the reducing of the diameter of the preliminary cladding pipe, the internal diameter of the inner pipe is reduced equal to or less than the original diameter of the insertion body.

12. The method of claim 1, wherein the outer pipe has ductility greater than that of the inner pipe.

* * * * *